US010131253B2

(12) United States Patent
Tashiro et al.

(10) Patent No.: US 10,131,253 B2
(45) Date of Patent: Nov. 20, 2018

(54) AUTOMOBILE SEAT

(71) Applicants: TACHI-S CO., LTD., Akishima-shi, Tokyo (JP); HONDA MOTOR CO., LTD., Minato-ku, Tokyo (JP)

(72) Inventors: Yuta Tashiro, Tokyo (JP); Hirofumi Fuwa, Saitama (JP)

(73) Assignees: TACHI-S CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/418,729

(22) Filed: Jan. 29, 2017

(65) Prior Publication Data

US 2017/0225596 A1 Aug. 10, 2017

(30) Foreign Application Priority Data

Feb. 4, 2016 (JP) .................................. 2016-019666

(51) Int. Cl.
*B60N 2/46* (2006.01)
*B60N 2/20* (2006.01)
*B60N 2/75* (2018.01)
(52) U.S. Cl.
CPC ............ *B60N 2/4613* (2013.01); *B60N 2/206* (2013.01); *B60N 2/757* (2018.02); *B60N 2/79* (2018.02)
(58) Field of Classification Search
CPC ........ B60N 2/4613; B60N 2/757; B60N 2/75; B60N 2/753; A47C 7/543
USPC ........................ 297/113, 378.1, 411.3, 411.32
See application file for complete search history.

(56) References Cited

U.S. PATENT DOCUMENTS

| 3,103,630 | A | * | 9/1963 | Pitts | B60N 2/79 455/346 |
| 3,506,301 | A | * | 4/1970 | Van Santen | B60N 2/882 297/113 |
| 4,558,901 | A | * | 12/1985 | Yokoyama | B60N 2/767 297/113 |
| 4,667,492 | A | * | 5/1987 | Tomatsu | B60N 2/366 70/261 |
| 4,880,264 | A | * | 11/1989 | Yamazaki | B60N 2/366 292/226 |

(Continued)

FOREIGN PATENT DOCUMENTS

| JP | U 60-65133 | 5/1985 |
| JP | 2004-106669 A | 4/2004 |

OTHER PUBLICATIONS

Office Action dated Jul. 25, 2017, in Japanese Patent Application No. 2016-019666.

*Primary Examiner* — Jose V Chen
(74) *Attorney, Agent, or Firm* — Shapiro, Gabor and Rosenberger, PLLC

(57) ABSTRACT

An automobile seat includes a right seat, a center seat, and a left seat. The center seat includes a center seat cushion and a center seat back having one end rotatably supported for reclining to the side of the center seat cushion and raising therefrom. A belt is attached to the center seat back, while being grasped by a hand of a passenger for reclining to the side of the center seat cushion to be brought into abutment on the skin of the seat cushion. The thus configured automobile seat reduces fricative sound generated by collision and friction between the center seat back and the center seat cushion owing to movement up and down of the automobile in the reclined state, resulting in alleviated discomfort given to the passenger.

15 Claims, 7 Drawing Sheets

(56) References Cited

U.S. PATENT DOCUMENTS

| | | | | |
|---|---|---|---|---|
| 4,973,017 | A * | 11/1990 | Takagi | B60N 3/004 248/292.13 |
| 5,150,946 | A * | 9/1992 | Marfilius | B60N 3/101 297/188.15 |
| 5,628,543 | A * | 5/1997 | Filipovich | B60R 5/006 297/113 |
| 6,386,629 | B1 * | 5/2002 | Severinski | B60N 2/3011 297/188.1 |
| 7,458,634 | B2 * | 12/2008 | Schlecht | B60N 2/757 297/113 |
| 7,523,991 | B2 * | 4/2009 | Thompson | B60N 2/58 297/452.38 |
| 9,120,406 | B2 * | 9/2015 | Sato | B60N 2/4228 |
| 2004/0140697 | A1 * | 7/2004 | Yuhki | B60N 2/793 297/113 |
| 2008/0150341 | A1 * | 6/2008 | Salewski | B60N 2/757 297/411.38 |
| 2010/0244502 | A1 * | 9/2010 | Andersson | B60N 2/468 297/118 |
| 2012/0074741 | A1 * | 3/2012 | Andersson | B60N 2/46 297/188.14 |
| 2012/0139279 | A1 * | 6/2012 | Uwague-Igharo | B60N 3/101 296/37.8 |
| 2016/0272093 | A1 * | 9/2016 | Jakubec | B60N 2/757 |
| 2017/0203678 | A1 * | 7/2017 | Gomez | B60N 2/757 |
| 2017/0225596 | A1 * | 8/2017 | Tashiro | B60N 2/206 |
| 2017/0305309 | A1 * | 10/2017 | Akai | B60N 2/757 |

* cited by examiner

F I G. 7
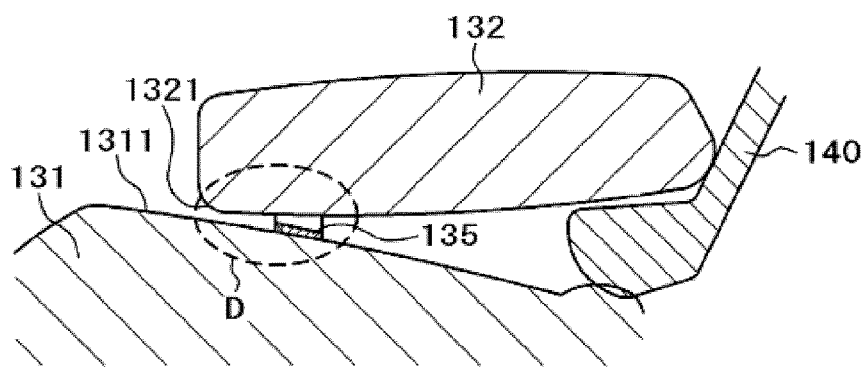
F I G. 8
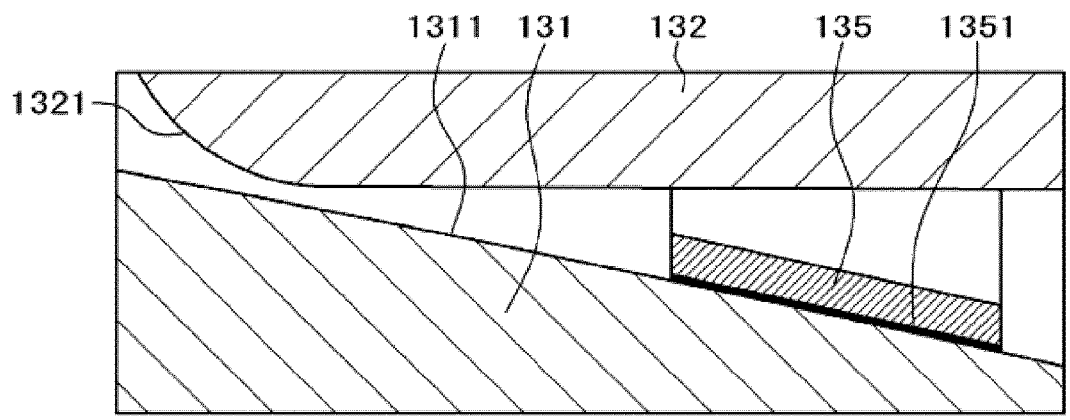

AUTOMOBILE SEAT

CLAIMS OF PRIORITY

The present application claims priority from Japanese Patent Application JP 2016-19666 filed on Feb. 4, 2016, the content of which is hereby incorporated by reference into this application.

BACKGROUND

The present invention relates to an automobile seat configured to allow a center seat part of a three-person seat to be reclined so as to be used as an arm rest.

Japanese Patent Application Laid-Open No. 2004-106669 discloses the automobile seat configured to recline the center seat part of the three-person seat so as to be used as the arm rest. Specifically, FIG. 6 of the aforementioned publication illustrates the structure that the center seat back part forming a pair with the center seat cushion part of the center seat part between the right and left seats is configured to be rotatable forward independently from the seat back parts of the right and left seats. The center seat back part is reclined to the side of the center seat cushion part so as to serve as the arm rest between the left and right seats.

SUMMARY

As disclosed in Japanese Patent Application Laid-Open No. 2004-106669, in the case of using the center seat back part between the right and left seats of the three-person seat while being reclined to the side of the center seat cushion part so as to serve as the arm rest, the tip end of the center seat back part abuts on the surface of the center seat cushion part to stop reclining of the center seat back part. Upon driving of the automobile in the aforementioned state, the center seat back part may be vertically moved up and down to cause collision and friction at the part where the tip end of the center seat back part abuts on the surface of the center seat cushion part. The collision or friction may result in hammering sound or fricative sound, giving discomfort to the passenger. The above-described discomforting phenomena becomes more remarkable if each surface of the center seat back part and the center seat cushion part is covered with either synthetic leather or real leather.

The present invention provides the automobile seat configured to allow reclining of the center part of the three-person seat so as to be used as the arm rest. Specifically, the automobile seat is configured to reduce the fricative sound generated by collision or friction between the center seat back part and the surface of the center seat cushion part owing to vertical movement up and down of the automobile in a state that the center seat back part is reclined to the side of the center seat cushion part, thus alleviating discomfort given to the passenger.

The present invention provides an automobile seat including a right seat, a center seat and a left seat. The center seat includes a center seat cushion and a center seat back, both surfaces of which are covered with synthetic leather. The center seat back is configured to have one end rotatably supported so as to be reclined to the side of the center seat cushion and raised therefrom. A belt is attached to the center seat back, which is grasped by a hand of a passenger upon reclining of the center seat back to the side of the center seat cushion so as to be brought into abutment on a skin of the center seat cushion.

The present invention provides an automobile seat including a right seat, a center seat and a left seat. The center seat includes a center seat cushion and a center seat back, both surfaces of which are covered with synthetic leather. The center seat back is allowed to be reclined to a side of the center seat cushion so as to be used as an arm rest. In the case of using the center seat back as the arm rest, the center seat back is configured to abut on the center seat cushion at a plurality of parts.

In the case of reclining the center seat back part of the three-person seat covered with synthetic leather to the side of the center seat cushion part so as to be used as the arm rest, the structure according to the present invention is capable of reducing the hammering sound or fricative sound generated by collision and friction between the center seat back part and the surface of the center seat cushion part owing to movement up and down of the automobile.

These features and advantages of the invention will be apparent from the following more particular description of preferred embodiments of the invention, as illustrated in the accompanying drawings.

BRIEF DESCRIPTION OF THE DRAWINGS

FIG. 7 is a sectional view taken along line A-A of FIG. 2, showing the automobile seat structure according to a third embodiment of the present invention;

FIG. 8 is an enlarged view of a part encircled by a dashed line D of the sectional view of FIG. 7, showing the automobile seat structure according to the third embodiment of the present invention;

DESCRIPTION OF THE PREFERRED EMBODIMENTS

Figure 1:
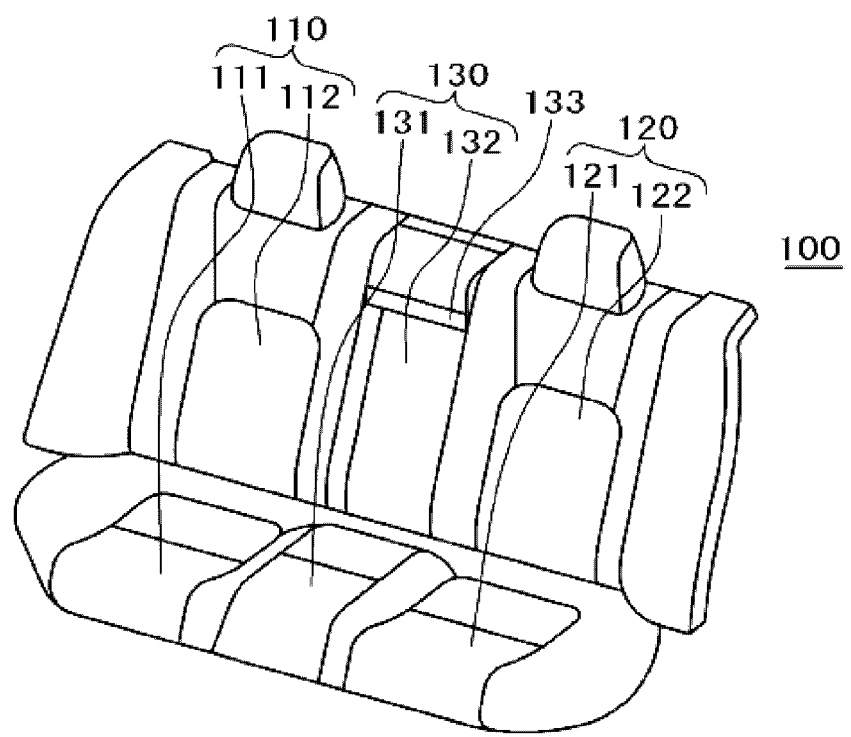
FIG. 1 is a perspective view of an automobile seat with a structure according to a first embodiment of the present invention in a state that the center seat back is raised.

The present invention provides an automobile seat having a three-person seat configured to recline a center seat back part to the side of a center seat cushion part so as to be used as an arm rest. In the structure, the number of contact points or contact area between the center seat back part and the center seat cushion part is increased so as to reduce the hammering sound and the fricative sound generated by collision and friction therebetween owing to movement up and down including vertical vibration (hereinafter written as movement up and down) of the automobile. This makes it possible to alleviate discomfort given to the passengers.

Embodiments of the present invention will be described referring to the drawings. It is to be understood that the present invention is not intended to limit contents of the embodiments to be described below. Persons skilled in the art are capable of easily understanding that the specific structure may be modified so long as it is kept in the range of concept and scope of the present invention.

The same or similar parts of the structure according to the present invention as described below will be designated with the same reference numerals in the respective drawings, and explanations of those parts, thus, will be omitted.

First Embodiment

FIG. 1 shows a structure of an automobile seat 100 formed as a three-person seat according to the present embodiment. The automobile seat 100 includes a right seat 110 constituted by a right seat cushion 111 and a right seat back 112, a left seat 120 constituted by a left seat cushion 121 and a left seat back 122, and a center seat 130 constituted by a center seat cushion 131 and a center seat back 132.

A belt 133 is attached to an upper part of the center seat back 132 of the center seat 130.

Figure 2:
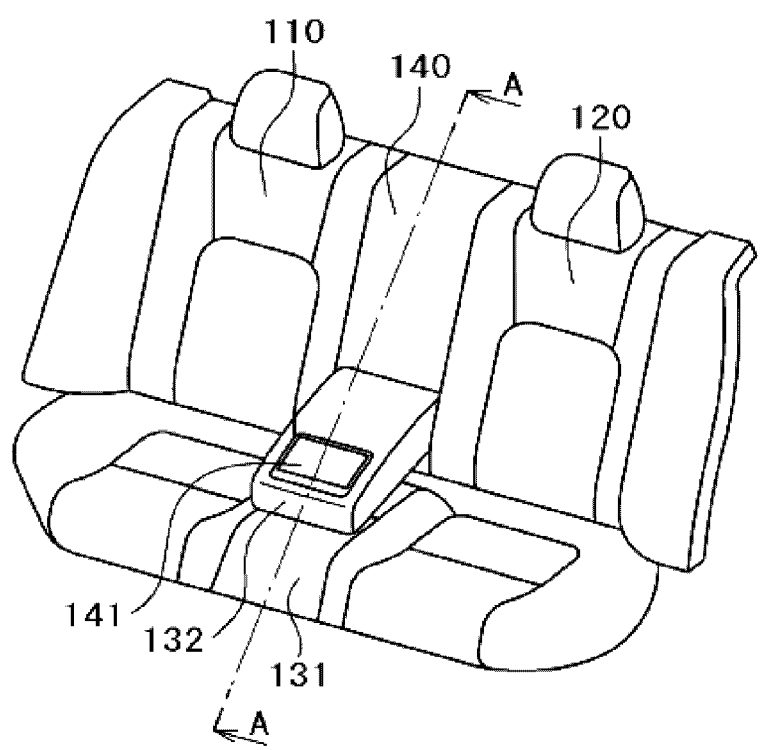
FIG. 2 is a perspective view of the automobile seat with the structure according to the first embodiment of the present invention in a state that the center seat back is reclined so as to be used as an arm rest.

If no passenger is seated on the center seat 130, the center seat back 132 is reclined forward while grasping, with a hand of a passenger, the belt 133 attached to the upper part of the center seat back 132 so as to be used as the arm rest having a cup holder 141 formed on the upper surface as shown in FIG. 2.

Figure 3:
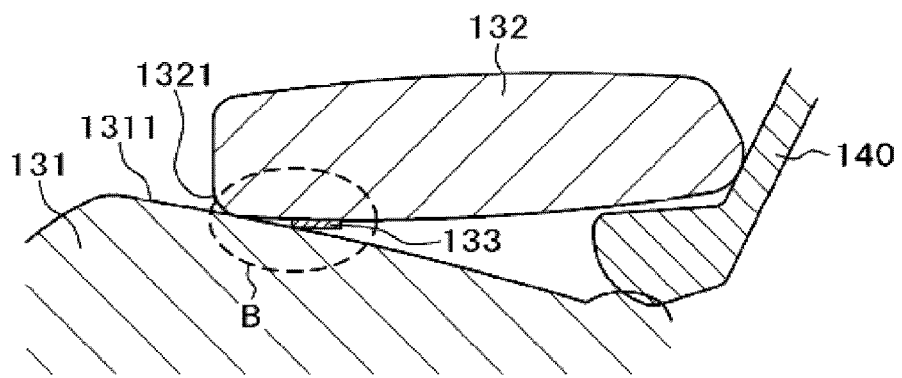
FIG. 3 is a sectional view taken along line A-A of FIG. 2, showing the automobile seat structure according to the first embodiment of the present invention.

FIG. 3 is a sectional view taken along line A-A of FIG. 2, indicating the state that the center seat back 132 is reclined forward so as to be used as the arm rest. The angular part at the tip end of the center seat back 132 reclined forward is held in abutment on the center seat cushion 131. A back plate 140 supports the center seat back 132 which is rotatably supported thereto with a support shaft which is not shown.

In the state that the center seat back 132 as shown in FIG. 3 is held in abutment on the center seat cushion 131, the lower angular part at the tip end part of the center seat back 132, and an end of the belt 133 attached to the center seat back 132 abut on the center seat cushion 131. In this case, both a skin 1321 of the center seat back 132 and a skin 1311 of the center seat cushion 131 are made of synthetic leather.

Figure 4:
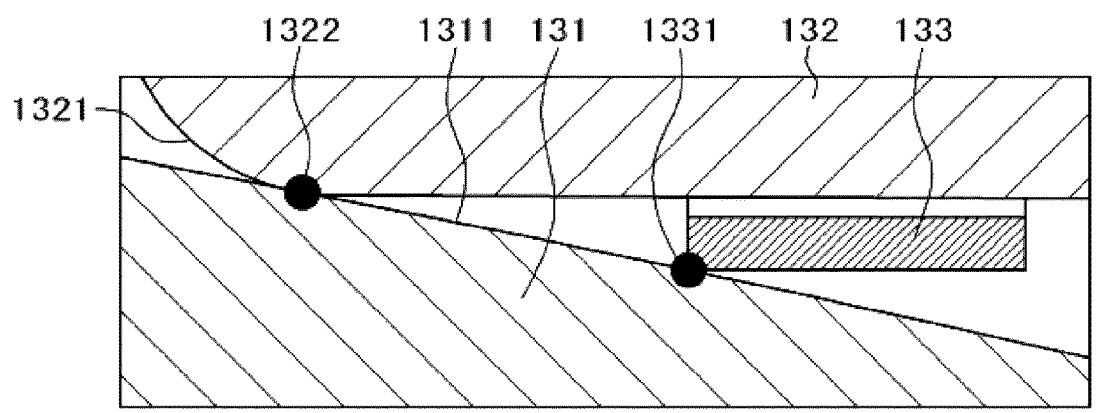
FIG. 4 is an enlarged view of a part encircled by a dashed line B of the sectional view of FIG. 3, showing the automobile seat structure according to the first embodiment of the present invention.

FIG. 4 is an enlarged view of a part encircled by a dashed line B as shown in FIG. 3. Referring to the cross section of FIG. 4, the center seat cushion 131 abuts on the center seat back 132 at two points expressed as black circles, that is, a lower angular part 1322 at the tip end of the center seat back 132, and an end part 1331 of the belt 133 attached to the center seat back 132.

If the automobile is driven in the above-described state, the center seat back 132 will rotate around a shaft (not shown) supported by the back plate 140 owing to movement up and down of the automobile under the effect of the road surface condition. Therefore, the tip end of the center seat back 132 will moves up and down with respect to the center seat cushion 131. This may cause collision and friction between the skin 1311 of the center seat cushion 131, and the skin 1321 and the belt 133 of the center seat back 132, resulting in hammering sound and fricative sound.

The volume of hammering sound or fricative sound generated in the aforementioned state is proportional to the impact force generated upon collision or frictional pressure between the skin 1311 of the center seat cushion 131, and the skin 1321 and the belt 133 of the center seat back 132. In this embodiment, the skin 1311 of the center seat cushion 131 is designed to be brought into contact with the center seat back 132 at two points, that is, the lower angular part 1322 of the tip end, and the end part 1331 of the belt 133 (referring to cross sections of FIGS. 3 and 4, the contact is made at two points, but actually, it is made at two linear regions).

As the skin 1311 of the center seat cushion 131 is in contact with two points (two regions), the impact force and the pressure applied from the lower angular part 1322 at the tip end of the center seat back 132 to the skin 1311 of the center seat cushion 131 may be reduced by substantially half compared with the case that the skin 1311 of the center seat cushion 131 is brought into contact only with the lower angular part 1322 of the tip end of the center seat back 132.

This makes it possible to lower the volume of hammering sound and fricative sound generated by collision and friction between the skin 1311 of the center seat cushion 131 and the skin 1321 of the center seat back 132, resulting in alleviated discomfort given to the passenger.

This embodiment has been explained with respect to the case that the skin of the belt 133 is made of synthetic leather likewise the skin 1321 of the center seat back 132. However, the skin of the belt 133 may be made of fabric. The use of fabric for forming the skin of the belt 133 may further lower the volume of the fricative sound generated by friction between the skin 1311 of the center seat cushion 131 and the skin 1321 of the center seat back 132, resulting in further alleviated discomfort given to the passenger.

This embodiment has been explained with respect to the case that the skin 1311 of the center seat cushion 131 abuts on the center seat back 132 at two points, that is, the lower angular part 1322 at the tip end of the center seat back 132, and the end part 1331 of the belt 133 attached to the center seat back 132 while being reclined to the side of the center seat cushion 131 so as to be used as the arm rest. The embodiment is not limited to the structure as described above, but may be configured to allow the center seat cushion to abut on three or more points by forming a protruding part on the center seat back 132.

Second Embodiment

Increase in the area of the contact between the skin 1321 of the center seat back 132 and the skin 1311 of the center seat cushion 131 may further reduce the pressure applied from the skin 1321 of the center seat back 132 to the skin 1311 of the center seat cushion 131. This makes it possible to further lower volumes of the hammering sound and fricative sound generated by collision and friction between the skin 1311 of the center seat cushion 131 and the skin 1321 of the center seat back 132 compared with the first embodiment.

Figure 5:
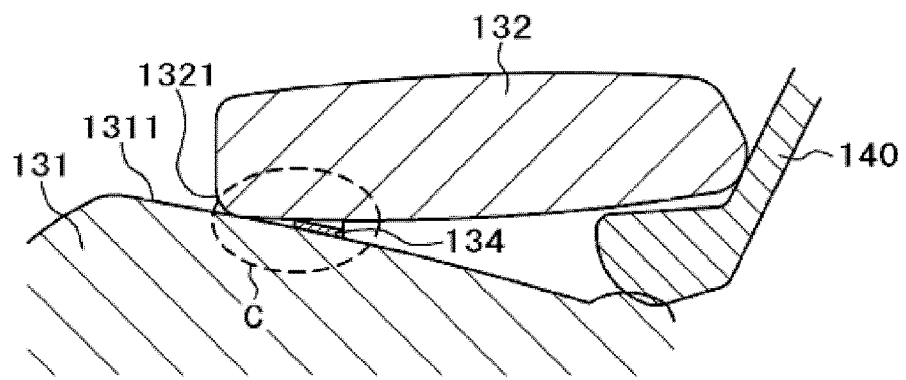
FIG. 5 is a sectional view taken along line A-A of FIG. 2, showing the automobile seat structure according to a second embodiment of the present invention.

The structure of the present embodiment is basically the same as that of the first embodiment. As FIG. 5 shows, this embodiment is configured to allow an entire surface 1341 of a lower side of the belt 134 attached to the center seat back 132 (the side facing the center seat cushion 131) to abut on the skin 1311 of the center seat cushion 131. FIG. 5 is a sectional view taken along line A-A of FIG. 2 in the state that the center seat back 132 is reclined forward so as to be used as the arm rest.

Figure 6:
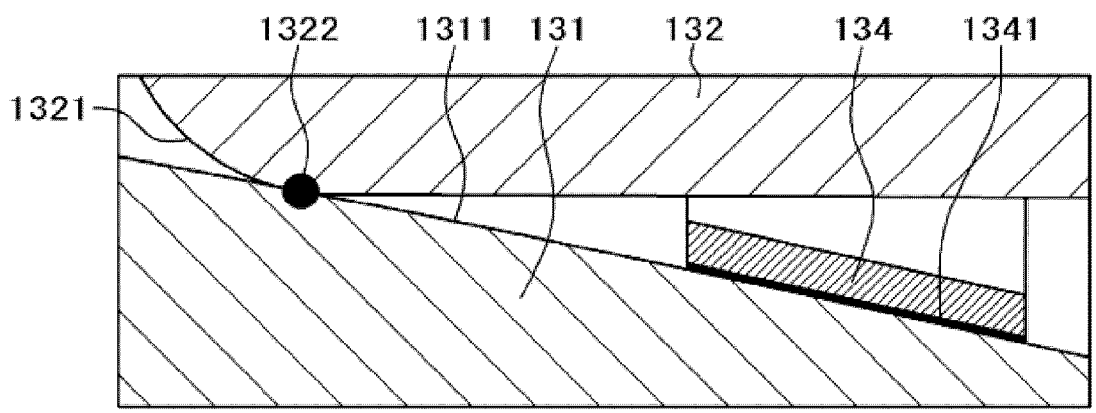
FIG. 6 is an enlarged view of a part encircled by a dashed line C of the sectional view of FIG. 5, showing the automobile seat structure according to the second embodiment of the present invention.

FIG. 6 is an enlarged view of the part encircled by the dashed line C in FIG. 5. The cross section of FIG. 6 shows that the center seat cushion 131 abuts on the center seat back 132 at two points, that is, the lower angular part 1322 as indicated by the black circle at the tip end of the center seat back 132, and the lower surface 1341 of the belt 134 attached to the center seat back 132.

This structure increases the area of contact between the center seat cushion 131 and the center seat back 132 by allowing abutment of the center seat cushion 131 both on the lower angular part 1322 at the tip end of the center seat back 132, and the lower surface 1341 of the belt 134 attached to the center seat back 132, thus reducing the pressure applied to the contact part compared with the first embodiment.

Upon driving of the automobile in the above-described state, in response to the movement up and down of the automobile affected by the road surface condition, the center seat back 132 rotates around the journaled part (not shown) of the back plate 140, and has its tip end vertically swung with respect to the center seat cushion 131. As a result, collision and friction between the skin 1311 of the center seat cushion 131, and both the skin 1321 and the belt 134 of the center seat back 132 will generate the hammering sound and the fricative sound.

In this state, however, the pressure generated at the contact part between the center seat cushion 131 and the center seat back 132 is relatively lower than the pressure generated in the case of the first embodiment. This makes it possible to lower the volume of the hammering sound and the fricative sound generated by collision and friction between the skin 1311 of the center seat cushion 131, and both the skin 1321 and the belt 134 of the center seat back 132 compared with the first embodiment.

Referring to the cross section of FIG. 6, by obliquely attaching the belt 134 to the center back 132, it becomes easy to put a hand between the belt 134 and the center seat back 132 when putting the hand between the belt 134 and the center seat back 132 to grasp the belt 134 by the hand and tilting the center seat back 132 to the side of the center seat cushion 131.

In this embodiment, the skin of the belt 134 is made of fabric so as to lower the volume of the fricative sound generated by the friction between the skin 1311 of the center seat cushion 131 and the skin 1321 of the center seat back 132, thus ensuring to further alleviate the discomfort giving to the passenger.

Third Embodiment

The first and the second embodiments have been described with respect to the case that the skin 1311 of the center seat cushion 131 is brought into contact with both the tip end, and the belt 133 or 134 of the center seat back 132. This embodiment will describe the case that the skin 1311 of the center seat cushion 131 is brought into contact only with a belt 135 of the center seat back 132 as shown in FIGS. 7 and 8.

The structure of this embodiment is basically the same as those according to the first and the second embodiments. Referring to FIG. 7, a lower surface 1351 (facing the center seat cushion 131) of the belt 135 of the center seat back 132 entirely abuts on the skin 1311 of the center seat cushion 131. Meanwhile, the tip end of the center seat back 132 does not abut on the center seat cushion 131. FIG. 7 is a sectional view taken along line A-A of FIG. 2, representing the state that the center seat back 132 is reclined forward so as to be used as the arm rest.

FIG. 8 is an enlarged view of the part encircled by the dashed line D shown in FIG. 7. Referring to the cross section of FIG. 8, the tip end of the center seat back 132 is not in contact with the center seat cushion 131, and the lower surface 1351 of the belt 135 attached to the center seat back 132 abuts on the center seat cushion 131.

Although the effect of this embodiment is slightly inferior to that of the second embodiment, the structure which allows the lower surface 1351 of the belt 135 of the center seat back 132 to abut on the center seat cushion 131 is more effective than the first embodiment because of increased area of the abutment between the center seat cushion 131 and the center seat back 132, thus lowering the pressure applied to the abutment part.

Upon driving of the automobile in the above-described state, in response to the movement up and down of the automobile affected by the road surface condition, the center seat back 132 rotates around the journaled part (not shown) of the back plate 140, and has its tip end vertically swung with respect to the center seat cushion 131. As a result, collision and friction between the skin 1311 of the center seat cushion 131 and the belt 135 of the center seat back 132 will generate the hammering sound and the fricative sound.

In this state, however, the pressure generated at the contact part between the center seat cushion 131 and the center seat back 132 is relatively lower than the pressure generated in the case of the first embodiment. This makes it possible to lower the volume of the hammering sound and the fricative sound generated by collision and friction between the skin 1311 of the center seat cushion 131 and the belt 135 of the center seat back 132 compared with the first embodiment.

Referring to the cross section of FIG. 8, by obliquely attaching the belt 135 to the center back 132, it becomes easy to put a hand between the belt 134 and the center seat back 132 when putting the hand between the belt 135 and the center seat back 132 to grasp the belt 135 by the hand and tilting the center seat back 132 to the side of the center seat cushion 131.

In this embodiment, likewise the first and the second embodiments, the skin of the belt 135 is made of fabric so as to lower the volume of the fricative sound generated by the friction between the skin 1311 of the center seat cushion 131 and the belt 135 of the center seat back 132, thus ensuring to further alleviate the discomfort giving to the passenger.

Fourth Embodiment

The first to the third embodiments have been described with respect to the case that each of the skin 1321 of the center seat back 132, and the skin 1311 of the center seat cushion 131 is made of synthetic leather. This embodiment will describe the case that the angular part at the tip end of the center seat back 132 having the synthetic leather skin 1321 is made of a fabric 136.

The automobile seat according to this embodiment includes the right seat, the center seat, and the left seat. The center seat includes the center seat cushion and the center seat back. The center seat back is configured to have one end rotatably supported so as to be reclined to the side of the center seat cushion and raised therefrom. In the state that the center seat back is reclined to the side of the center seat cushion, the angular part at the tip end of the center seat back that abuts on the skin of the center seat cushion is covered with fabric.

Figure 9:
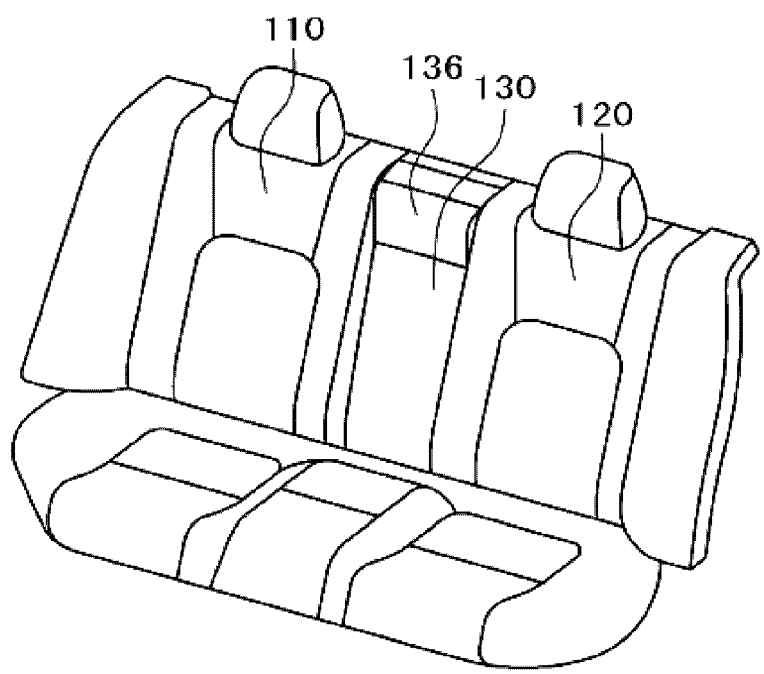
FIG. 9 is a perspective view of the automobile seat with the structure according to a fourth embodiment of the present invention in a state that the center seat back is raised.

FIG. 9 shows the automobile seat structure according to the embodiment. Referring to the automobile seat of the embodiment, the center seat 130 between the right seat 110 and the left seat 120 has the surface of the angular part at the tip end of the center seat back 132 covered with the fabric 136. The fabric 136 may be sewn to the skin 1321 of the center seat back 132, or fixed thereto using the adhesive agent or Velcro®.

Figure 10:
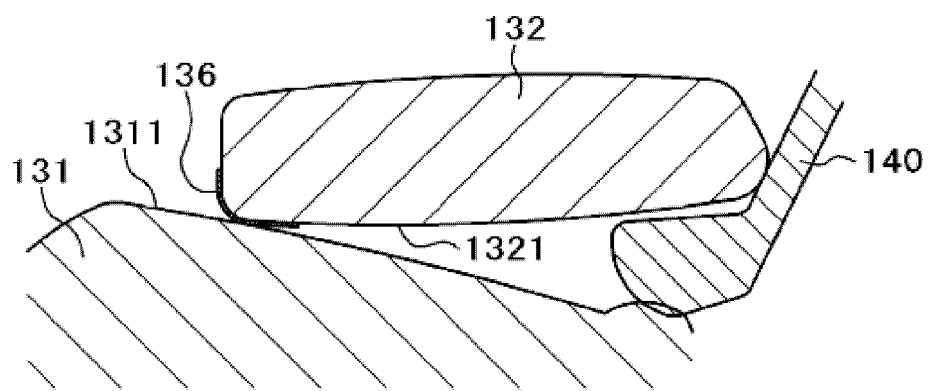
FIG. 10 is a sectional view showing a part of the automobile seat structure according to the fourth embodiment of the present invention, corresponding to the cross section taken along line A-A of FIG. 2.

FIG. 10 is a sectional view taken along line A-A of FIG. 2, representing the state that the center seat back 132 is reclined forward so as to be used as the arm rest as described in the first embodiment referring to FIG. 2.

Referring to the cross section of FIG. 10, the fabric 136 which covers the angular part surface at the tip end of the center seat back 132 abuts on the skin 1311 of the center seat cushion 131.

Upon driving of the automobile in the above-described state, in response to the movement up and down of the automobile effected by the road surface condition, the center seat back 132 rotates around the journaled part (not shown) of the back plate 140, and has its tip end vertically swung with respect to the center seat cushion 131. As a result, collision and friction between the skin 1311 of the center seat cushion 131, and the fabric 136 that covers the angular part at the tip end of the center seat back 132 may generate the hammering sound and the fricative sound.

In this state, however, the sound of hammering and friction is absorbed by the fabric 136 that abuts on the skin 1311 of the center seat cushion 131. Accordingly, the volume of the hammering sound and the fricative sound may be made lower than the one in the case of using the synthetic leather for forming the angular part at the tip end of the center seat back 132. This makes it possible to lower the volume of the hammering sound and the fricative sound generated by collision and friction between the skin 1311 of the center seat cushion 131 and the belt 133 of the center seat back 132 compared with the first embodiment.

FIGS. 9 and 10 showing the center seat back 132 according to this embodiment omit illustration of the belts 133 and 134 as described in the first and the second embodiments. It is possible to provide the structure according to this embodiment with the belts 133, 134 as described in the first and the second embodiments. The end part 1331 of the belt 133 as described in the first embodiment is not brought into contact with the skin 1311 of the center seat cushion 131 so as to allow only the fabric 136 that covers the angular part surface at the tip end of the center seat back 132 to abut on the skin 1311 of the center seat cushion 131.

Fifth Embodiment

The fourth embodiment has been described in a case of using the fabric 136 that covers the part of the skin 1321 of the center seat back 132 in abutment on the center seat cushion 131 when it is reclined to the side thereof. This embodiment will describe the use of a softer cushion member 137 for a part of the cushion material that constitutes the center seat back 132.

The automobile seat according to this embodiment includes the right seat, the center seat, and the left seat. The center seat includes the center seat cushion and the center seat back. The center seat back is configured to have one end rotatably supported so as to be reclined to the side of the center seat cushion and raised therefrom. In the state that the center seat back is reclined to the side of the center seat cushion, the angular part at the tip end of the center seat back that abuts on the skin of the seat cushion is made of the material softer than the one for forming the other part of the center seat back.

Figure 11:
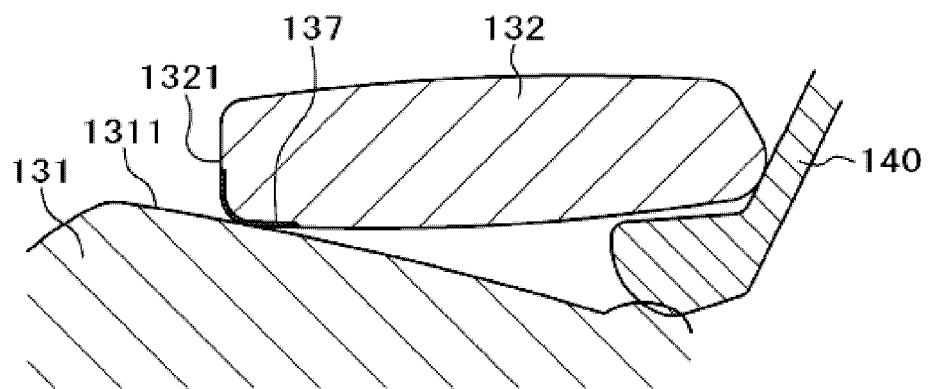
FIG. 11 is a sectional view showing a part of the automobile seat structure according to a fifth embodiment of the present invention, corresponding to the cross section taken along line A-A of FIG. 2.

FIG. 11 is a sectional view of the center seat cushion 131 and the center seat back 132 according to this embodiment, corresponding to the sectional view taken along line A-A of FIG. 2, representing the state that the center seat back 132 is reclined forward so as to be used as the arm rest as described in the first embodiment referring to FIG. 2.

Referring to the cross section of FIG. 11, a soft cushion member 137 softer than the cushion material that constitutes the center seat back 132 is applied to the angular part at the tip end of the center seat back 132. The surface of the center seat back 132 including the surface of the soft cushion member 137 is covered with the skin 1321 made of synthetic leather.

Upon driving of the automobile in the above-described state, in response to the movement up and down of the automobile affected by the road surface condition, the center seat back 132 rotates around the journaled part (not shown) of the back plate 140, and has its tip end vertically swung with respect to the center seat cushion 131. As a result, the hammering sound and the fricative sound will be generated by collision and friction between the skin 1311 of the center seat cushion 131 and the skin 1321 of the center seat back 132, the angular part at the tip end of which is covering the softer cushion member 137.

In this state, however, the skin 1321 covering the soft cushion member 137 is deformed more largely than the cases of the first and the second embodiments so that the skin surface, rather than the point thereof is brought into contact with the skin 1311 of the center seat cushion 131 as indicated by the cross section of FIG. 11. The pressure generated at the surface of the contact between the skin 1311 of the center seat cushion 131 and the skin 1321 covering the soft cushion member 137 is lowered. This makes it possible to reduce the hammering sound and the fricative sound generated by collision and friction between the skin 1311 of the center seat cushion 131 and the skin 1321 of the center seat back 132 compared with the case using no soft cushion member 137.

FIG. 11 showing the center seat back 132 according to this embodiment omits illustration of the belts 133 and 134 as described in the first and the second embodiments. It is possible to provide the structure according to this embodiment with the belts 133 and 134 as described in the first and the second embodiments. The end part 1331 of the belt 133 as described in the first embodiment is not brought into contact with the skin 1311 of the center seat cushion 131 so as to allow only the skin 1321 covering the soft cushion member 137 in the angular part at the tip end of the center seat back 132 to abut on the skin 1311 of the center seat cushion 131.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. An automobile seat including a right seat, a center seat and a left seat, wherein:

the center seat includes a center seat cushion and a center seat back, both surfaces of which are covered with synthetic leather;

the center seat back is configured to have one end rotatably supported such that the center seat back can be reclined to the side of the center seat cushion and raised therefrom;

a tip end part of the center seat back comes into abutment with a skin of the center seat cushion when the center seat back is reclined to the side of the center seat cushion; and a belt is attached over an entire width of the center seat back for grasping by a hand of a passenger to recline the center seat back to the side of the center seat cushion and bring the belt into abutment with the skin of the center seat cushion together with the tip end part of the center seat back, thereby increasing a number of contact points or a contact area between the center seat back and the center seat cushion so as to reduce noise generated by collision and friction therebetween due to up-and-down movement.

2. The automobile seat according to claim 1, wherein an angular part of the tip end of the center seat back abuts the skin of the c enter seat cushion in a state that the center seat back is reclined to the side of the center seat cushion.

3. The automobile seat according to claim 1, wherein the belt is attached so as to have its surface facing the center seat cushion brought into abutment with the skin of the center seat cushion in a state that the center seat back is reclined to the side of the center seat cushion.

4. The automobile seat according to claim 3, wherein an angular part of the tip end of the center seat back abuts the skin of the center seat cushion in a state that the center seat back is reclined to the side of the center seat cushion.

5. The automobile seat according to claim 1, wherein the belt has its surface made of a fabric.

6. An automobile seat including a right seat, a center seat and a left seat, wherein:

the center seat includes a center seat cushion and a center seat back, both surfaces of which are covered with synthetic leather;

the center seat back can be reclined to a side of the center seat cushion so as to be used as an arm rest; and in the case of using the center seat back as the arm rest, the center seat back is configured to abut the center seat cushion at a plurality of parts including a portion of a belt which is attached over an entire width of the center seat back for grasping by a hand of a passenger to recline the center seat back to the side of the center seat cushion.

7. The automobile seat according to claim 6, wherein at least one of the plurality of parts of the center seat back that abuts the center seat cushion has a surface covered with a fabric.

8. The automobile seat according to claim 6, wherein the belt is positioned between a base end and a tip end of the center seat back, and is spaced from the base end and the tip end.

9. The automobile seat according to claim 6, wherein the belt is arranged such that no portion of the belt can protrude forwardly from the center seat back when the center seat back is positioned for use as the arm rest.

10. The automobile seat according to claim 6, wherein when the center seat back is positioned for use as the arm rest, the belt abuts the center seat cushion over an entire height of the belt.

11. The automobile seat according to claim 6, wherein when the center seat back is positioned for use as the arm rest, the belt abuts the center seat cushion only at an edge region of the belt.

12. The automobile seat according to claim 1, wherein the belt is positioned between the one end and the tip end of the center seat back, and is spaced from the one end and the tip end.

13. The automobile seat according to claim 1, wherein the belt is arranged such that no portion of the belt can protrude forwardly from the center seat back when the center seat back is reclined to the side of the center seat cushion.

14. The automobile seat according to claim 1, wherein when the center seat back is reclined to the side of the center seat cushion, the belt abuts the center seat cushion along an entire height of the belt.

15. The automobile seat according to claim 1, wherein when the center seat back is reclined to the side of the center seat cushion, the belt abuts the center seat cushion only at an edge region of the belt.

* * * * *